Nov. 21, 1961  J. A. KOHN ET AL  3,009,363
VARIABLE RATIO TRANSMISSION MECHANISM
Filed Dec. 7, 1959  4 Sheets-Sheet 1

Inventors:
Julius A. Kohn,
William Vande Vaarst,
by H. F. Manbeck, Jr.
Attorney.

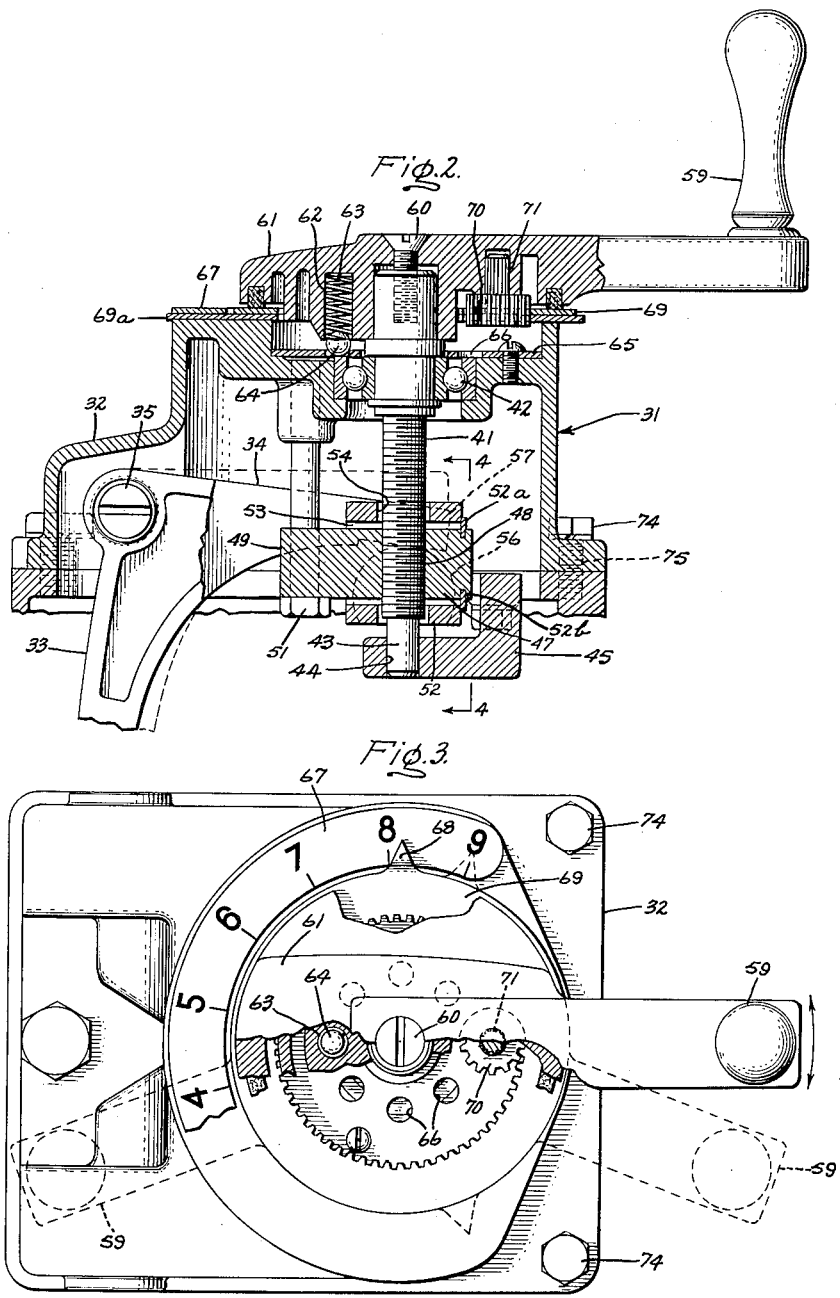

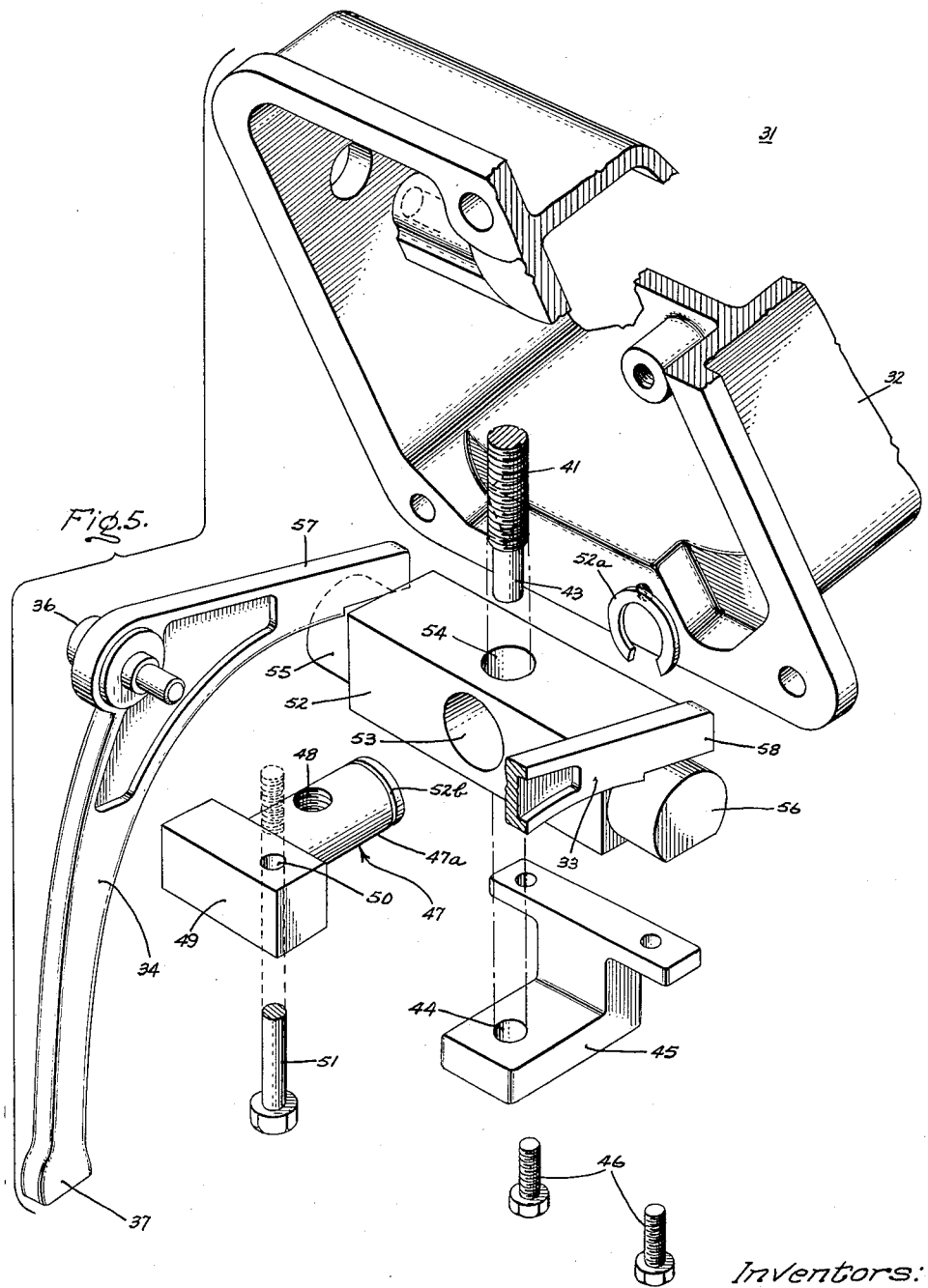

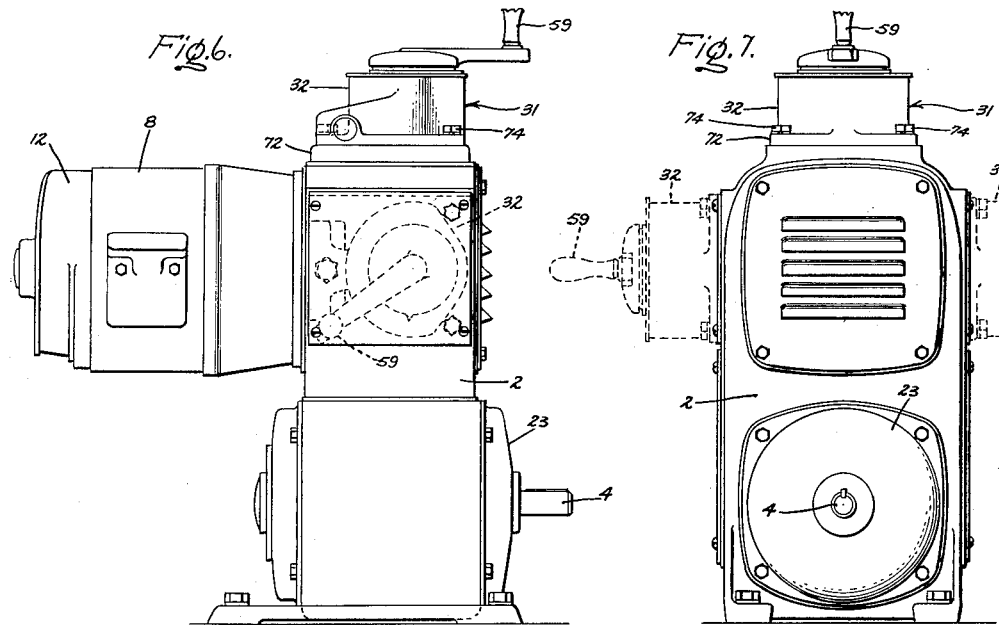
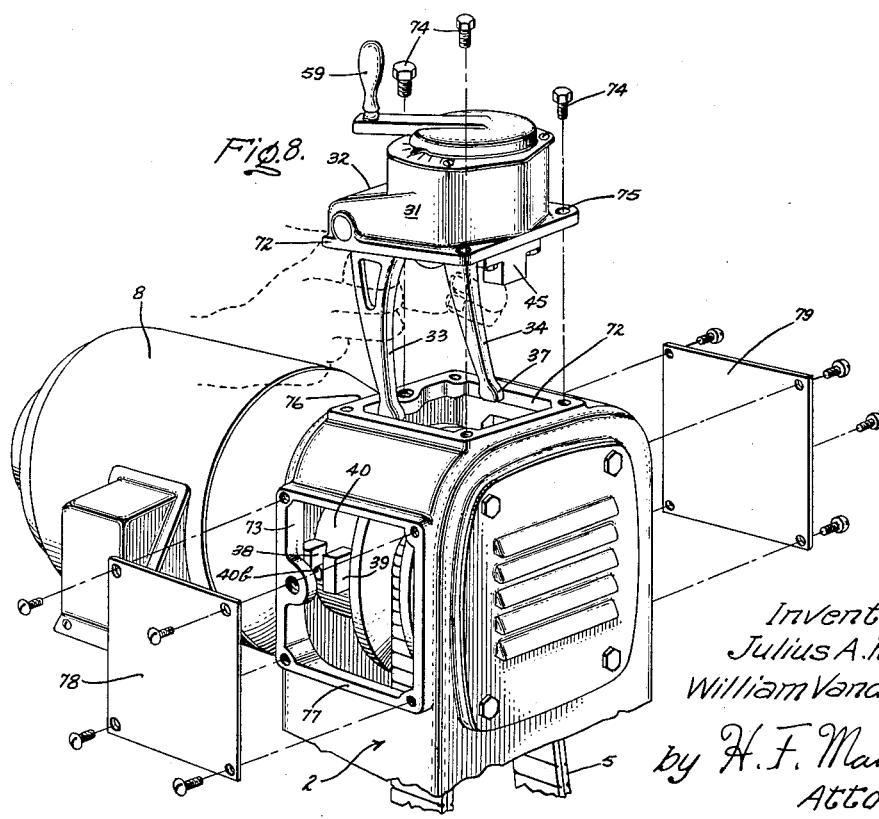

United States Patent Office 3,009,363
Patented Nov. 21, 1961

3,009,363
VARIABLE RATIO TRANSMISSION MECHANISM
Julius A. Kohn, Waldwick, and William Vande Vaarst, Little Falls, N.J., assignors to General Electric Company, a corporation of New York
Filed Dec. 7, 1959, Ser. No. 857,872
11 Claims. (Cl. 74—230.17)

Our invention relates to adjustable ratio transmission mechanisms and more particularly to such mechanisms in which the variation in the speed ratio between the driving and driven shafts is obtained by means of a drive belt coupling the two shafts.

In adjustable speed belt drive mechanisms the variation in the speed ratio is obtained by varying the effective diameters of the pulleys on the driving and driven shafts. The pulleys are each provided with oppositely disposed coned pulley sections and in each pulley one of these sections is movable axially along the shaft. Means are provided for adjusting the movable sections of one of the pulleys relative to its axially fixed cooperating section, and as this section is moved toward or away from the other section, an opposite movement is effected of the movable pulley section on the other shaft. The drive belt is of the wedge or V-type and as the control pulley section is adjusted so as to allow the belt to move inwardly toward its shaft, or alternately to force the belt outwardly away from the shaft, the changing pull on the belt results in an opposite adjustment of the movable pulley section on the other shaft. Thus, if the control section is moved so as to decrease the effective diameter of its pulley, the movable section of the other pulley is adjusted so as to increase its diameter; and the converse is true if the control pulley section is adjusted in the other direction. As a result of the effective diameters of the pulleys being changed in opposite directions, the speed ratio between the driving and driven shaft may be varied over a wide range.

These adjustable ratio mechanisms or drives, as they are commonly known, are customarily built as integrated units including a drive motor, a supporting frame or housing, the driving and driven shafts with their pulley structures, and adjusting means for varying the pulleys. The mechanisms are preferably constructed and arranged so that they may be mounted in a number of different positions to adapt them to various applications to which they may be put by the purchaser. For example, some users may wish to place the drive in a position with the belt vertical where others may wish the belt to extend horizontally, all determined by the space available for accommodating the drive and the position in which its output shaft must be for coupling to the load. Since the manufacturer may not necessarily know how the drive is to be used when it is built, it is extremely desirable and, in fact, almost essential that the control mechanism of the drive be so arranged that it will be available no matter how the drive may ultimately be used. In other words, the control mechanism should be so arranged that the user will have access to it no matter how he may mount and position the drive.

It is therefore an object of our invention to provide an improved adjustable ratio transmission mechanism or drive in which the control mechanism may be simply and easily located in a number of different positions so as to be readily accessible no matter how the transmission is arranged. In this regard, it is a further object of our invention to provide a control mechanism which may be readily removed from one location and replaced in another location with a minimum of trouble and without any disassembly of the transmission parts being required.

In addition to being readily accessible, it is also desirable that the control mechanism be such that it can be easily adjusted at all times while the drive is in operation. It has been found that in certain control mechanisms, the force applied by the adjustable control pulley during operation of the drive causes binding in the mechanism so as to make it very difficult and even next to impossible to adjust the drive during operation. It is, therefore, another object of our invention to provide an improved control mechanism including means which prevent binding of the movable control parts and thereby insure that the drive may be readily adjusted during operation.

In carrying out our invention, we provide an adjustable ratio transmission mechanism or drive having a main housing for supporting and enclosing the driving and driven shafts and their associated pulley structures. The main housing also serves to mount the control mechanism. This housing is provided with means which define a plurality of control locations on it, and, according to our invention, a unitary control mechanism is provided which is arranged for alternate mounting in any one of these locations. The unitary control mechanism includes linkage means for adjusting the ratio of the transmission, externally operable control means for actuating the linkage means, and a main support member which mounts both the linkage means and the external control means. With this mounting of the movable units on the main support member, the control mechanism is removable as a unit from any one of the control locations and is readily replaceable in any other of the locations. Thus, when the transmission mechanism is coupled to its load or when it is changed from one load to another, the control mechanism may be simply and easily positioned on the mechanism in a location where it is readily accessible for adjustment by the operator.

By a further aspect of our invention, a control mechanism is provided which will not bind or lock as a result of the forces applied to its linkages by the drive during operation. In other words, by this further aspect, we provide a mechanism which may be readily adjusted to vary the speed ratio while the drive is in operation. This mechanism comprises a lead screw and a nut which is actuated by the lead screw for movement along it. A follower is mounted on the nut for movement therewith along the axis of the lead screw, and linkage means are provided which engage the follower on opposite sides of the lead screw. These linkage means are connected to an adjustable pulley section of the drive through suitable connecting means, and they are operated by the lead screw through the nut and follower for varying the position of the adjustable pulley section to change the speed ratio of the drive. To prevent binding of the mechanism, the follower is rotatable around the nut through a limited angle, which results in the forces of the linkage means being equalized at all times. With equal force being applied to the linkage means, there will be no cocking of the nut on the lead screw so as to cause binding and thereby the control mechanism is readily adjustable at all times.

The subject matter which we regard as our invention is particularly pointed out and distinctly claimed in the concluding portion of this specification. Our invention, however, both as to organization and method of operation, together with further objects and advantages thereof, may best be understood by reference to the following description taken in conjunction with the accompanying drawings in which:

FIG. 2 is a cross-sectional view of the unitary control mechanism included in the transmission mechanism of FIG. 1;

FIG. 3 is a plan view of the control mechanism of FIG. 2, the view being partially broken away to show details;

FIG. 5 is an exploded prospective view of the control mechanism with portions broken away for ease of understanding;

FIG. 6 is a side elevational view of the transmission mechanism of FIG. 1, illustrating in dotted lines an alternate position of the unitary control mechanism;

FIG. 7 is an end view of the transmission also illustrating alternate positions of the control mechanism by means of dotted lines; and FIG. 8 is a fragmentary prospective view of the transmission mechanism illustrating how the control mechanism may be placed in various locations.

Figure 1:
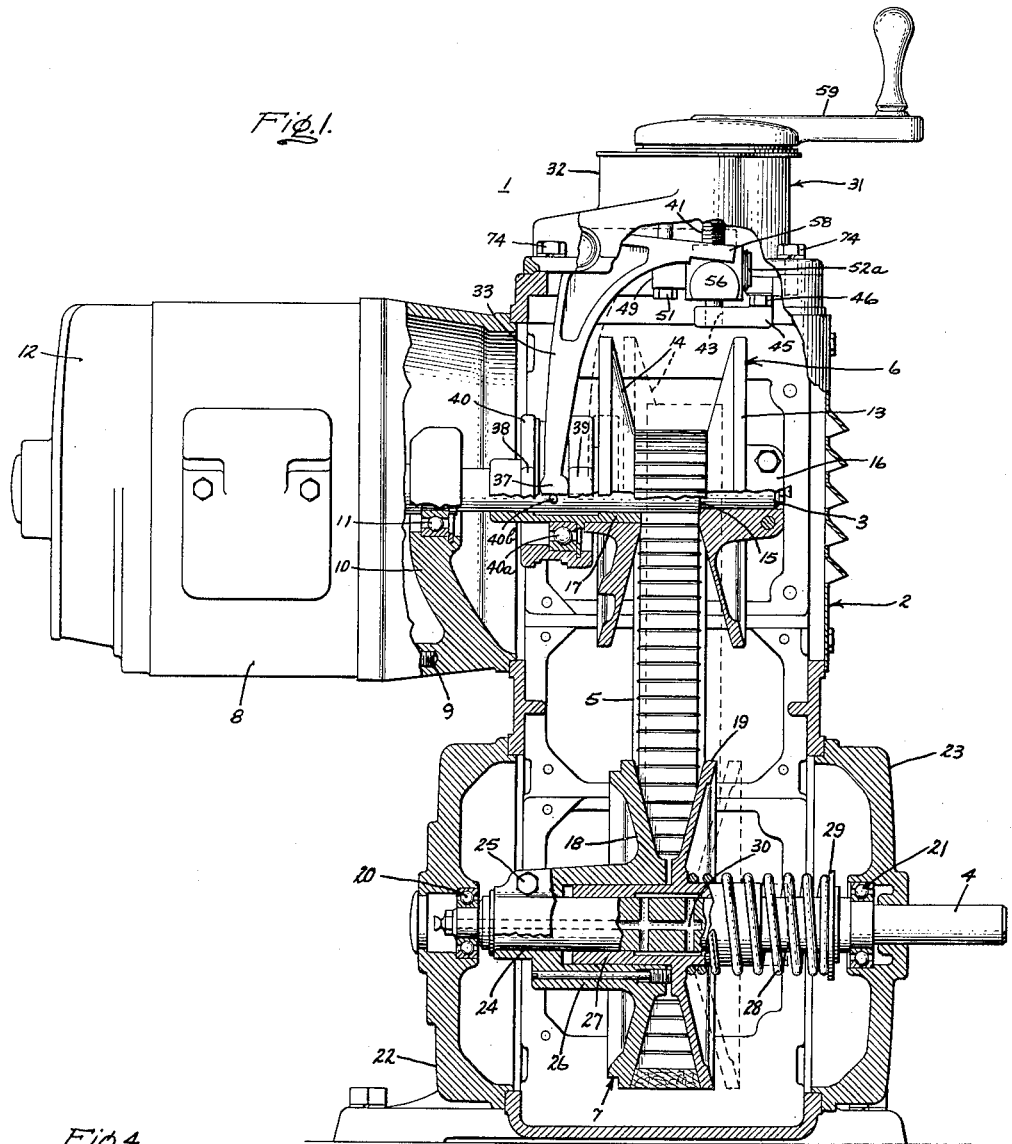
FIG. 1 is a side elevational view of a variable ratio transmission mechanism embodying our invention, the view being partially broken away and partially in section to show details.
Figure 4:
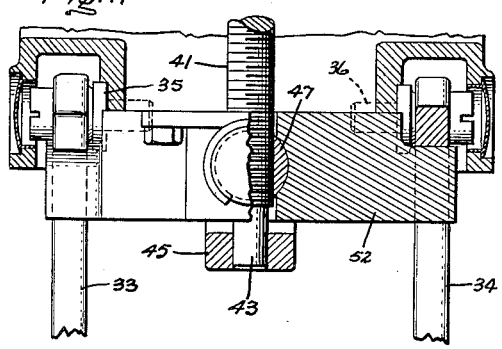
FIG. 4 is a fragmentary cross-sectional view of the control mechanism taken along the line 4—4 of FIG. 2.

Referring now to FIG. 1, we have shown therein an adjustable ratio transmission mechanism 1 embodying our invention in one preferred form thereof. The mechanism or drive 1 includes a main housing or frame 2 within which are mounted the various operating components of the mechanism. As shown, the mechanism includes a driving shaft 3 and a driven or output shaft 4 which are coupled by means of a wedge shaped belt 5. The belt 5 is disposed between adjustable pulley structures 6 and 7 mounted respectively on the driving and driven shafts; and as will be more fully explained hereinafter, the relative effective pulley diameters of the pulley structures 6 and 7 are varied in order to change the speed ratio between the driving and driven shafts.

The transmission mechanism 1 is powered by means of an electric motor 8 which is mounted on the housing or frame 2 by means of an annular adaptor or connector 9. Besides mounting the motor on the housing, the adaptor 9 also supports one of the bearings for the driving shaft 3. Specifically, the adaptor includes a spider 10 which supports a ball bearing assembly 11. The ball bearing assembly 11 forms the inboard bearing for the drive shaft 3 and it will be understood that the outboard bearing of the shaft is supported in the usual manner in the end shield 12 of the motor 8.

The adjustable pulley structure 6 is supported on the outer section of the shaft 3, which in the illustrated embodiments is over-hung from the bearing assembly 11. As shown, the pulley structure 6 includes a pair of oppositely disposed coned pulley sections 13 and 14. The right-hand pulley section 13 is axially fixed with regard to the shaft 3, its hub being fixed firmly to the shaft for rotation therewith. At its inner end, the hub of the pulley 13 abuts a shoulder 15 formed on shaft 3 and at its outer end the hub is provided with a split collar 16 which is drawn together by means of suitable bolts so as to hold the pulley section fixedly in the position shown.

The second pulley section 14 is arranged for rotation with the shaft 3, but unlike the fixed section 13, is adapted to move axially along the shaft 3. To this end, the pulley section 14 is fixedly secured, as by a press fit, on a sleeve 17 which is positioned on the shaft 3 and is connected for rotation with the shaft. The connection of the sleeve 17 to the shaft is made by axially extending splines (not shown) which engage similar splines on the shaft 3 so as to drive the sleeve from the shaft but permit it to be moved axially along the shaft. As will be more fully explained hereinafter, the sleeve 17 is adjusted axially on the shaft 3 thereby to move the pulley section 14 relative to the pulley section 13. This adjusts the effective diameter of the driving pulley structure 6 and results in the speed ratio being changed between the driving and driven shafts.

The pulley structure 7 on the driven shaft 4 likewise comprises a pair of oppositely disposed coned pulley sections, namely the pulley sections 18 and 19. The driven shaft 4 is mounted in ball bearing assemblies 20 and 21 supported in removable end plates 22 and 23 of the housing 2, and the pulley structure 7 is mounted on the shaft between these bearing assemblies. As shown, the pulley section 18 includes a split hub or collar portion 24 which is fixedly attached to the driven shaft by means of clamp bolts 25. Between the main flange or cone of the pulley section 18 and the hub 24, there is a connection portion or sleeve 26 which is spaced away from the shaft 4. The clearance between the sleeve portion 26 and the shaft 4 provides a space for accommodating the left-hand end (as viewed in FIG. 1) of a sleeve 27 mounting the adjustable pulley section 19. In the illustrated form of the invention, the pulley section 19 is formed integrally with the sleeve 27 and thereby moves with it at all times. The sleeve 27 is keyed to the driven shaft 4 by means of a suitable spline so that it will rotate with the shaft but may move axially on it. Thus, the pulley section 19 may be moved toward or away from the pulley section 18 to adjust the effective diameter of the driven pulley structure 7. The movable section 19 is normally biased toward the fixed section 18 by means of a strong coil spring 28 which is mounted between the section 19 and an axially fixed retaining ring 29 mounted on the shaft. In FIG. 1, the spring 28 is shown as biasing the pulley 19 to the maximum effective diameter position for the driven pulley 7. The sleeve 27 may be lubricated to provide for easy movement on the shaft by means of suitable lubricant passageways 30 formed in the shaft 4. It will be understood that similar lubricant passageways (not shown) may be formed in the shaft 3 for lubricating the inner surface of the sleeve member 17.

In order to adjust the pulley structures 6 and 7, the mechanism 1 is provided with a control unit 31 which forms an important aspect of our invention. Referring to FIG. 2–5, it will be seen that the control unit 31 comprises a unitary mechanism having a housing 32 which serves to mount all of its components. To adjust the position of the control pulley section 14, the unitary mechanism 31 includes a pair of levers or bell cranks 33 and 34 which are mounted on the housing or cover member 32 by means of suitable pivot pins 35 and 36. At their lower ends, the bell cranks 33 and 34 are provided with enlarged sections 37 which fit between oppositely disposed pairs of raised lugs 38 and 39 (FIG. 1) formed on a control member or collar 40 which is disposed around the driving shaft 3. As shown in FIG. 1, the collar 40 constitutes a bearing cage supporting the outer race of a ball bearing assembly 40a, the inner race of which is attached to the sleeve 17. Rotation of the collar with respect to the links 33 and 34 is prevented by oppositely disposed anti-rotation pins 40b (FIG. 1) on the collar 40 which bear against the bottom of the enlarged portions 37 of the levers. With this arrangement, the collar or cage 40 remains stationary relative to the pulley section 14 but yet as it is moved axially along the shaft, it will move the sleeve 17 and the pulley section 14 with it. This movement as will be described more fully hereinafter is effected by means of the bell crank levers 33 and 34 of the control unit 31.

In order to actuate the bell crank levers 33 and 34, the control unit 31 is provided with a lead screw 41 which is mounted in the mechanism cover 32 by means of a ball bearing assembly 42. With this mounting, the lead screw may rotate relative to the cover but does not move axially. For steadying and further mounting lead screw, it is provided with a smooth, reduced diameter portion 43 at its lower end, and this portion extends into a suitable bore 44 provided in a mounting foot 45. As shown in FIG. 5, the foot 45 is attached to the cover member 32 by means of suitable screws 46 and it aids the ball bearing in holding the lead screw 41 in the illustrated position.

Mounted on the lead screw for actuating the bell cranks 33 and 34 is a traveling nut member 47. The nut 47 includes a cylindrical portion 47a having a tapped bore 48 for engaging the lead screw, and it also has an outer or transverse portion 49 having a smooth bore 50 for accommodating the shaft of a stationary bolt 51 which is threaded into the cover member 32 at its upper end. With this arrangement, the bolt 51 prevents the nut 47 from turning with the control screw 41 and therefore the nut travels up and down the screw as it is rotated. It will be understood that the downward travel of the nut 47 may be limited by adjusting the position of the bolt 51 relative to the top of the housing, the head of the bolt serving as a stop for the nut.

The bell crank levers 33 and 34 are actuated from the traveling nut 47 by means of a rotatable cross-arm or follower 52 which is rotatably mounted on the cylindrical section 47a of the nut. As shown, the cross-arm or follower 52 includes a smooth, generally horizontal bore 53 (as viewed in FIG. 5) and this bore is fitted over the cylindrical section 47a of the nut 47 to mount the follower rotatably thereon. With the follower 52 mounted on the nut, a spring washer 52a is fitted into a groove 52b in the nut to retain the follower thereon. The follower 52 also includes a second bore 54 which extends at right angles to the bore 53. This second bore 54 accommodates the lead screw 41 when it is threaded into the nut 47. However, as may be best seen in FIG. 2, the bore 54 is of greater diameter than the threads of the lead screw 41 so that there is clearance between it and the screw when the follower is in position. Thus, limited rotation or pivoting of the follower 52 may occur on the nut 47 during the operation of the apparatus. As will be more fully described below, the limited rotational movement is effective to equalize the forces applied to the traveling nut 47 from the two bell cranks 33 and 34 during operation of the drive 1, and is thereby effective to prevent cocking and binding of the nut on the lead screw.

At its ends on opposite sides of the lead screw 41, the follower 52 is provided with extensions or lugs 55 and 56. The lugs 55 and 56 are rounded on their upper surfaces and as shown they engage the upper ends 57 and 58 of the bell crank levers 34 and 33. As the traveling nut 47 is moved up and down by the lead screw, it, of course, carries the follower 52 with it and as the follower 52 moves, it causes the bell cranks 33 and 34 to turn on their pivots 35, 36. As the bell cranks pivot, they allow the control collar 40 to be moved axially in one direction or another along the driving shaft 3 of the mechanism. This movement of the control collar, of course, causes the pulley section 14 to move with it, the pulley section being coupled thereto through the ball bearing assembly 40a and the sleeve 17. This, of course, results in an adjustment in the speed ratio between the driving and driven shafts.

To explain briefly the manner in which the movement of the control pulley section 14 causes a variation in the speed ratio, assume the pulley section 14 to be in the full line position shown in FIG. 1. Then if the bell crank levers 33 and 34 are moved by means of the lead screw 41, the adjustable nut 47 and the follower 52 so that the levers pivot counterclockwise, the pulley section 14 will be moved to the right against the side force exerted by the belt. The side force of the belt is, of course, always such as to force pulley sections apart. As the pulley section 14 moves to the right, it will necessarily cause the belt 5 to move upwardly between it and the fixed pulley section 13. In other words, the effective diameter of the driving pulley structure 6 will be increased with the belt 5 and the control section 14 assuming the positions shown by the dotted lines. As the effective diameter of the driving pulley structure 6 is changed, this, of course, places an upward force on the belt 5 and this force is such as to tend to move the adjustable section 19 of the driven pulley 7 to the right. Thus, as the effective diameter of the driving pulley structure increases, the movable section 19 of the driven pulley structure 7 moves to the right, as illustrated by the dotted lines, to decrease the effective diameter of the driven pulley. With the effective diameter of the driven pulley decreasing as that of the driving pulley increases, a change in the speed ratio between the shafts is effected with the driven shaft speeding up with regard to the driving shaft. To return the drive to its original setting, or to any speed ratio therebetween, the lead screw is merely turned in the opposite direction allowing the side force of the belt to force the pulley section 14 to the left causing the bell cranks to pivot clockwise toward their original positions. As the pulley section 14 moves to the left, the belt 5 shifts downward and to the left in the pulley structure 6. This allows the belt to slacken and as a result it also moves downwardly in the driven pulley structure 7, this effect occurring because of the centrifugal force acting on the belt and the thrust exerted by the spring 28. As the belt so moves downward, the spring 28 moves the pulley section 19 also to the left whereby the effective diameter of the driven pulley increases as that of the driving pulley decreases. Thus, it will be seen that the movable pulley sections 14 and 19 are adjusted oppositely in response to the actuation of the bell crank levers 33 and 34 to effect any desired speed ratio between the driving and driven shafts.

In considering the operation of the control mechanism to adjust the pulley structures, it will be remembered that the follower 52 may pivot through a limited angle on the cylindrical surface 47a of the adjusting nut 47. During the operation of the drive 1, the side thrust exerted by the belt 5 on the pulley section 14 is transmitted through the sleeve 17 the bearing assembly 40a, the collar 40 and the bell cranks 33 and 34 to the follower 52. The follower being pivotally mounted turns on the nut 47 so that equal force is transmitted through the two bell cranks or links. This action will occur in spite of dimensional misalignments in the drive. The follower by receiving the equal forces from the bell cranks, of course, holds them in position and thereby locates the sleeve 17 and the pulley 14 in the desired position of adjustment.

When it is desired to adjust the drive 1, assuming it to be in the positon shown, the lead screw 41 is turned so as to move the adjusting nut 47 and the follower 52 upwardly. The force applied by the follower to the bell cranks is then greater than the back force from the pulley section 14 and thereby the bell cranks pivot counterclockwise. This movement of the bell cranks, of course, shifts the sleeve 17 and the pulley section 14 to the right to adjust the speed ratio of the drive 1. Just as the follower pivots slightly to correct for misalignment and to assure that equal force is transmitted by the bell cranks during normal operation, so it pivots likewise during adjustment to provide the same result.

This action of the pivoted follower 52 is important because as a result of its force equalization effect there is no moment or torque tending to cause cocking of the nut 47 on the lead screw 41 or cocking of the bearing assembly 40a on the sleeve 17. With cocking of the nut being prevented, it will always turn easily at any time to adjust the drive 1 while the drive is in operation. Similarly, with cocking of the bearing 40a prevented, the life of the bearing will be increased. The forces exerted by the links 33, 34 on the cartridge 40 will always tend to be parallel to the axis of the driving shaft 3, and will be equal to each other. Thus, no overturning movement is created tending to increase the pressure between the sleeve 17 and the shaft 3 beyond that resulting from the belt 5. This minimizes the fretting corrosion between the mating surfaces or splines of the sleeve and the driving shaft and thereby increases the life of the drive. It has been found that on certain drives without this follower pivotally mounted on the adjusting nut a cocking torque may be supplied to the adjusting nut making it impossible or extremely difficult to turn the control handle. The pivoting follower on the adjusting nut thus comprises an important aspect of our invention.

Referring further to the control mechanism 31, it will be remembered that all of its components are supported by the main housing or cover member 32. Besides the elements already mentioned, it will be seen that the control mechanism includes a handle 59 by means of which the lead screw 41 is turned, although it will be understood that other means such as an electric motor, or hydraulic or pneumatic actuators may be used to turn the lead screw. The handle 59, which is of suitable design for manual actuation, is affixed to the top of the lead screw 41 by means of a bolt 60 (FIG. 2) screwed into a tapped hole in the top of the lead screw and is prevented from moving angularly with respect to the lead screw by means of a key (not shown). As the handle is turned, the lead screw is, of course, turned with it to move the traveling nut 47 and the follower 52 thereby to adjust the drive.

The handle 59 is provided with a circular section 61 around the top of the lead screw and this section 61 includes a recess 62 in which is positioned a detent spring 63. The spring 63 biases a detent ball 64 downwardly into contact with a plate 65 which overlies the bearing assembly 42. The plate 65 is provided with a plurality of spaced apart apertures 66, and the ball 64 is engageable in these various apertures as the control handle is rotated. It will be seen that when the handle is turned to any particular position, the ball 64 is biased into the aperture 66 corresponding to that position to hold the control handle releasably in the position. In other words, the spring 62 and ball 64 provides a detent means for holding the control mechanism and thereby the control pulley section 14 to any desired position of adjustment.

Besides the control components and the detent means, the control unit 31 also includes an indicating mechanism for showing the relative position of adjustment of the drive. Referring to FIGS. 2 and 3, it will be seen that the indicating arrangement includes a semi-circular scale 67 which is fixedly mounted on the cover 32 and a rotating pointer 68 which cooperates with this scale. The pointer 68 is mounted on an internal ring gear 69 which is rotatably mounted on the control mechanism cover 32 between a fixed internal ring gear 69a and the circular portion 61 of the handle. A pinion 70 which is rotatably carried on a knurled stub shaft 71 press fitted into a recess in the handle mates with the movable ring gear 69 and the fixed ring gear 69a so as to turn the gear 69 during rotation of the handle. The drive of the gear 69 is obviously of the planetary drive providing a reduction effect between the handle and the gear 69. Thus, the indicator 68 moves slowly along the scale 67 as the handle is turned and thereby gives an accurate indication of the position of adjustment of the drive. It will be noted that this indicating mechanism being mounted entirely on the cover member 32 is removable integrally with the rest of the control unit 31.

By another important aspect of our invention, the unitary control mechanism 31 may be mounted on a number of different positions on the main mechanism housing 2 so as to provide access to the control handle and indicator for different positionings of the drive. As is best shown in FIGS. 6–8, to accomplish this end, the main mechanism housing 2 is provided with three separate locations for the control mechanism 31. Specifically, three control openings are provided in the housing 2, one at the top of the housing and the other two on the opposite sides of the housing. The opening 72 at the top of the housing and the opening 73 on the left side wall of the housing are shown in FIG. 8. It will be understood that there is a similar third opening immediately opposite the opening 73 on the right-hand side of the housing.

In FIG. 1 the control mechanism 31 is, of course, shown as mounted in the top control location. It will be noted that it is held in this position by means of a plurality of bolts 74. As shown in FIG. 8, these bolts 74 extend through apertures 75 provided in a flange of the cover 32, into tapped holes in a general rectangular ridge 76 formed on the top wall of the control housing around the opening 72. It will be noted that a tapped ridge or flange 77 similar to the ridge 76 is formed around the aperture 73 to provide the second control location, and it will be understood that a similar flange or ridge is provided around the control opening on the opposite side of the housing to form the third control location. To change the control unit from one location to another, the bolts 74 are withdrawn so as to free the control mechanism 31 from the housing 2. The entire mechanism may then be simply lifted out of place as a unit and placed into one of the other control locations. The only thing further which needs to be done to place the control mechanism in an operative state in the new location is to manually turn the collar 40 so that the lugs 38, 39 are aligned with the ends 37 of the control levers 33 and 34. It will be seen from FIG. 8 that the collar 40 is readily accessible through the control openings and it may be turned a half turn in either direction from the position shown in order to accommodate the control levers in their new position. Thus, to change the control from one location to another, it merely needs to be unbolted from the original position and reinserted in its new location with the collar 40 being turned a half turn so that the ends of the bell cranks 33, 34 will fit between the lugs 38, 39 and against the anti-rotation pins 40b. Since nothing in the mechanism itself needs to be disconnected or adjusted, the changing of the control lever from one position to another may be accomplished with a minimum of effort.

With a control location on the top of the drive 1 and with additional locations on its opposite sides it will be understood that no matter how the drive 1 is disposed, a position can almost always be found for the control 31 where it will be readily available to an operator. In some arrangements of the illustrated mechanism 1 the housing 2 may be mounted so that the belt 5 extends horizontally rather than vertically. In this case control unit 31 may be readily mounted in a position on top of the drive by putting it in the control location 73 or in the location opposite to 73. Thus, by our invention, we have provided a control arrangement whereby the mechanism 1 may be adapted to almost any use without a special control design being needed for different applications. It will be noted that cover plates 78 and 79 are provided for normally covering the control locations not mounting the control mechanism 31.

While in accordance with the patent statutes, we have described what at present is considered to be the preferred embodiment of our invention, it will be obvious to those skilled in the art that various changes and modifications may be made therein without departing from the invention, and it is therefore aimed in the appended claims to cover all such changes and modifications as fall within the true spirit and scope of the invention.

What we claim as new and desire to secure by Letters Patent of the United States is:

1. In a variable ratio transmission mechanism, a lead screw, a nut actuated by said lead screw for movement along said lead screw, a follower mounted on said nut for movement therewith along the axis of said lead screw, said nut having a cylindrical portion and said follower having a bore fitting over said cylindrical portion and journaling said follower for limited rotation on said nut, and linkage means engaging said follower on opposite sides of said lead screw and operated thereby for mechanically varying said ratio, said follower being rotatable about said nut through a limited angle for equalizing the forces transmitted through said linkage means.

2. In a variable ratio transmission, a lead screw, a cylindrical nut threaded on said lead screw for movement along said screw upon the rotation thereof, a follower mounted on said nut and movable with said nut along said lead screw, said follower having a bore accommodating said nut and journaling said follower for rotation on said nut, said follower having a pair of rounded extensions and a pair of levers engaging said follower on said rounded extensions on opposite sides of said lead screw and actuated thereby for varying said ratio, with said follower pivoting on said nut to equalize the forces transmitted through said levers.

3. In a variable ratio transmission, a lead screw, a cylindrical nut threaded on said lead screw for movement along said lead screw upon the rotation thereof, a follower mounted on said nut for movement therewith along said lead screw, said follower having a first bore accommodating said nut and journaling said follower for rotation about said nut, and a second bore perpendicular to said first bore for accommodating said lead screw, and a pair of pivoted levers engaging said follower on opposite sides of said lead screw and actuated thereby for varying said ratio, with said follower pivoting on said nut to equalize the forces transmitted through said levers.

4. In a variable speed mechanism including a driving shaft, a driven shaft, pulley structures respectively mounted on said shafts, and a belt operatively connecting said pulley structures, said pulley structures each having a pair of relatively adjustable pulley sections having opposed inclined belt engaging faces forming by relative axial adjustment variable effective pulley diameters; means for adjusting one of said pulley structures comprising an actuator disposed on the associated shaft and connected to move one of said pulley sections axially relative to the other, a pair of levers engaging said actuator on opposite sides of said shaft for moving said actuator, and means for actuating said levers comprising a lead screw, a nut actuated by said lead screw for movement along said lead screw, and a follower mounted on said nut for movement therewith along said lead screw, said nut having a cylindrical portion and said follower having a bore fitting over said cylindrical portion and journaling said follower for rotation on said nut, said levers engaging said follower on opposite sides of said lead screw for actuation thereby, and said follower being rotatable on said nut thereby to equalize the forces transmitted through said levers.

5. In a variable speed mechanism including a driving shaft, a driven shaft, pulley structures respectively mounted on said shafts, and a belt operatively connecting said pulley structures, said pulley structures each having a pair of relatively adjustable pulley sections having opposed inclined belt engaging faces forming by relative axial adjustment variable effective pulley diameters; means for adjusting one of said pulley structures comprising a normally nonrotatable control collar disposed on said shaft and connected to move one of said pulley sections axially relative to the other, a pair of levers engaging said collar on opposite sides of said driving shaft for moving said collar, and means for actuating said levers comprising a lead screw, a cylindrical nut threaded on said lead screw and actuated by said lead screw for movement along said lead screw, and a follower journaled on said nut for limited rotation thereon and moveable with said nut along said lead screw, said follower having a bore accommodating said nut and journaling said follower for said limited rotation and said follower being further provided with rounded extensions at opposite ends thereof, said levers engaging said follower on said rounded extensions on opposite sides of said lead screw for actuation thereby, with said follower pivoting on said nut to equalize the forces transmitted through said levers.

6. In a variable speed mechanism including a driving shaft, a driven shaft, pulley structures respectively mounted on said shafts, and a belt operatively connecting said pulley structures, said pulley structures each having a pair of relatively adjustable pulley sections having opposed inclined belt engaging faces forming by relative axial adjustment variable effective pulley diameters, and a control collar disposed on one of said shafts and connected to move one of the pulley sections thereof relative to the other; a housing enclosing said pulley structures and having a plurality of control mounting locations disposed at different angular locations around said one shaft, said control mounting locations each comprising a discrete opening in the top and side walls of said housing and a multi-part unitary control mechanism arranged for alternate mounting in any one of said locations for actuating said control collar, said unitary control mechanism comprising a main support member, linkage means mounted on said support member and arranged to engage said collar for displacing said collar axially along said driving shaft and externally operable control means mounted on said main support member and engaging said linkage means for actuating said linkage means, said unitary control mechanism being removable as a unit from any of said control mounting locations and being replaceable in any other of said locations.

7. In a variable speed mechanism including a driving shaft, a driven shaft, pulley structures respectively mounted on said shafts, and belt operatively connecting said pulley structures, the driving pulley structure having a pair of relatively adjustable pulley sections having opposed inclined belt engaging faces forming by relative axial adjustment variable effective pulley diameters, and a control collar disposed on said driving shaft and connected to move one of said pulley sections relative to the other; a housing enclosing said pulley structure and having a plurality of openings in its side walls disposed at different angular positions relative to said driving shaft, and a unitary control mechanism arranged for alternate mounting over any of said openings for actuating said control collar for adjusting said mechanism, said unitary control mechanism comprising a main cover member, linkage means mounted on said cover member and arranged to extend through the selected one of said openings to engage said collar for displacing said collar axially along said driving shaft, and externally operable control means mounted on said main cover member and engaging said linkage means for actuating said linkage means, said unitary control mechanism being removable as a unit from any of said openings and being replaceable over any other of said openings.

8. In a variable ratio transmission, a driving shaft, a driven shaft, adjustable belt drive means connecting said driving shaft to said driven shaft, a housing enclosing said shafts and said adjustable belt drive means and including a plurality of openings in the top and side walls thereof with each opening forming a separate control location, and a multi-part unitary control mechanism arranged for alternate mounting in any one of said locations, said control mechanism comprising a cover member fitting over the opening of the selected location, at least one lever pivotally mounted on said cover member and extending through said opening of the selected location for varying the ratio of said transmission, a lead screw rotatably mounted on said cover member for actuating said lever, means operatively connecting said lever to said lead screw for actuation thereby, and an indicator mounted on said cover member and operatively connected to said lead screw for indicating the position of adjustment of said lever, said control mechanism being removable as a unit from any one of said control locations and replaceable in any other of said locations with said indicator being readily observable in any of said locations.

9. In a variable ratio transmission having a driving shaft, a driven shaft, adjustable pulley structures mounted on said shafts, a belt connecting said pulley structures, and a control collar disposed on one of said shafts for adjusting at least one of said pulley structures; a main housing for said mechanism, said housing including a plurality of openings in the side walls thereof with each opening forming a separate control location, and a unitary control mechanism arranged for alternate mounting in any one of said locations, said mechanism comprising a lead screw, a nut actuated by said lead screw, a follower journaled on said nut for limited rotation thereon and movable with said nut along said lead screw, a pair of levers engaging said follower on opposite sides of said lead screw and engaging said collar on opposite sides of said one shaft for actuating said collar, with said follower pivoting on said nut to equalize the forces transmitted through said levers between said follower and said collar, and a cover member mounting said lead screw and said levers, said cover member being detachable from said housing whereby said control mechanism may be removed as a unit from any of said control locations and replaced in any other of said locations.

10. In a variable ratio transmission having a driving shaft, a driven shaft, adjustable pulley structures mounted on said shafts, a belt connecting said pulley structures, and a control collar disposed on one of said shafts for adjusting at least one of said pulley structures; a main housing for said mechanism, said housing including a plurality of openings in the side walls thereof with each opening forming a separate control location, a unitary control mechanism arranged for alternate mounting in any one of said locations, said mechanism comprising a lead screw, a nut actuated by said lead screw, a follower journaled on said nut for limited rotation thereon and movable with said nut along said lead screw, a pair of levers engaging said follower on opposite sides of said lead screw and engaging said collar on opposite sides of said one shaft for actuating said collar, with said follower pivoting on said nut to equalize the forces transmitted through said levers between said follower and said collar, an indicator operatively connected to said lead screw for indicating the position of adjustment of said collar, and a cover member mounting said lead screw, said indicator and said levers, said cover member being detachable from said housing whereby said control mechanism may be removed as a unit from any of said control locations and replaced in any other of said locations with said indicator being visible in all of said locations.

11. In a variable ratio transmission having a motor, a driving shaft connected to said motor, a driven shaft, and adjustable belt drive means connecting said driving shaft to said driven shaft, a housing enclosing said shafts and said adjustable belt drive means and supporting said motor, said housing having a plurality of openings in the top and side walls thereof with each opening forming a separate control location, and a multi-part unitary control mechanism arranged for alternate mounting in any one of said locations, said mechanism including linkage means for adjusting the ratio of said adjustable belt drive means, externally operable control means for actuating said linkage, and integrated support means mounting both said linkage means and said externally operable control means, said control mechanism being removable as a unit from any one of said control locations and replaceable in any other of said locations without requiring the disconnection of said motor from said housing.

References Cited in the file of this patent

UNITED STATES PATENTS

| | | |
|---|---|---|
| 2,021,136 | Reeves | Nov. 19, 1935 |
| 2,277,004 | Reeves | Mar. 17, 1942 |
| 2,398,235 | Luenberger | Apr. 9, 1946 |
| 2,797,590 | Reeves | July 2, 1957 |